US012691437B2

(12) United States Patent
Zhou et al.

(10) Patent No.: US 12,691,437 B2
(45) Date of Patent: Jul. 28, 2026

(54) BISMUTH/BISMUTH TITANATE HETEROJUNCTION HOLLOW NANOSPHERES AND METHOD FOR PREPARING THE SAME AND APPLICATION THEREOF

(71) Applicant: QILU UNIVERSITY OF TECHNOLOGY (SHANDONG ACADEMY OF SCIENCES), Jinan (CN)

(72) Inventors: Wei Zhou, Jinan (CN); Xuepeng Wang, Jinan (CN); Zhenzi Li, Jinan (CN); Liping Guo, Jinan (CN); Shijie Wang, Jinan (CN); Lijun Liao, Jinan (CN); Bo Wang, Jinan (CN); Hongqi Chu, Jinan (CN); Zhangqian Liang, Jinan (CN)

(73) Assignee: QILU UNIVERSITY OF TECHNOLOGY SHANDONG ACADEMY, Jinan (CN)

( * ) Notice: Subject to any disclaimer, the term of this patent is extended or adjusted under 35 U.S.C. 154(b) by 377 days.

(21) Appl. No.: 18/294,940

(22) PCT Filed: May 26, 2023

(86) PCT No.: PCT/CN2023/096633
    § 371 (c)(1),
    (2) Date: Feb. 2, 2024

(87) PCT Pub. No.: WO2024/032097
    PCT Pub. Date: Feb. 15, 2024

(65) Prior Publication Data
    US 2025/0121358 A1     Apr. 17, 2025

(30) Foreign Application Priority Data
    Aug. 10, 2022     (CN) .......................... 202210955940.0

(51) Int. Cl.
    *B01J 23/18*         (2006.01)
    *B01J 35/39*         (2024.01)
        (Continued)

(52) U.S. Cl.
    CPC ............... *B01J 23/18* (2013.01); *B01J 35/39* (2024.01); *B01J 35/45* (2024.01); *B01J 35/52* (2024.01);
        (Continued)

(58) Field of Classification Search
    CPC ... B01J 23/18; B01J 35/39; B01J 35/45; B01J 35/52; B01J 37/031; B01J 37/04;
        (Continued)

(56) References Cited

FOREIGN PATENT DOCUMENTS

CN        102351242 A      2/2012
CN        107138148 A   *  9/2017   ............ B01J 23/002
        (Continued)

OTHER PUBLICATIONS

Translation of Qian (CN-107138148-A) (Year: 2017).*
        (Continued)

*Primary Examiner* — Ekandra S. Miller-Cruz
(74) *Attorney, Agent, or Firm* — Oliff PLC

(57)        ABSTRACT

The present invention belongs to the field of new material technology and relates to a bismuth/bismuth titanate heterojunction hollow nanospheres and methods for preparing the same and applications thereof. The bismuth/bismuth titanate heterojunction hollow nanospheres is obtained by adding a bismuth salt and tetrabutyl titanate into an organic solvent, mixing evenly, adding an inorganic alkali solution to generate a precipitation, then sequentially adding an organic amine and an organic acid, performing a solvothermal treatment to obtain bismuth titanate hollow nanospheres, and then thermally reducing the bismuth titanate hollow nanospheres with a borohydride under an inert atmosphere.

(Continued)

The bismuth/bismuth titanate heterojunction hollow nanospheres provided not only exhibit significant photocatalytic activity in degrading tetracycline hydrochloride but also enable a tighter binding of the metal to the photocatalytic material, thus offering superior structural stability.

12 Claims, 4 Drawing Sheets

(51) Int. Cl.

| | | |
|---|---|---|
| *B01J 35/45* | (2024.01) |
| *B01J 35/52* | (2024.01) |
| *B01J 37/03* | (2006.01) |
| *B01J 37/04* | (2006.01) |
| *B01J 37/08* | (2006.01) |
| *B01J 37/16* | (2006.01) |
| *C02F 1/32* | (2023.01) |
| *C02F 1/72* | (2023.01) |
| *C02F 101/36* | (2006.01) |

(52) U.S. Cl.
CPC ............. *B01J 37/031* (2013.01); *B01J 37/04* (2013.01); *B01J 37/08* (2013.01); *B01J 37/16* (2013.01); *C02F 1/32* (2013.01); *C02F 1/725* (2013.01); *C02F 2101/36* (2013.01); *C02F 2305/10* (2013.01)

(58) Field of Classification Search
CPC .. B01J 37/08; B01J 37/16; B01J 35/51; C02F 1/32; C02F 1/725; C02F 2101/36; C02F 2305/10; C02F 2305/08; C02F 1/30; C02F 2101/38; Y02W 10/37
USPC ..................................................... 210/748.14
See application file for complete search history.

(56) References Cited

FOREIGN PATENT DOCUMENTS

| | | |
|---|---|---|
| CN | 110368924 A | 10/2019 |
| CN | 114392750 A | 4/2022 |
| CN | 115318274 A | 11/2022 |

OTHER PUBLICATIONS

Wang et al., "Enhanced piezoelectric response in single-crystalline Bi4Ti3O12 nanoplates," EPL, Aug. 2013, vol. 103, 37002, pp. 1-6.
Sep. 2, 2023 International Search Report issued in International Patent Application No. PCT/CN2023/096633.
Sep. 2, 2023 Written Opinion of the International Searching Authority issued in International Patent Application No. PCT/CN2023/096633.

* cited by examiner

BISMUTH/BISMUTH TITANATE HETEROJUNCTION HOLLOW NANOSPHERES AND METHOD FOR PREPARING THE SAME AND APPLICATION THEREOF

The present invention claims priority to the Chinese patent application submitted to the China National Intellectual Property Administration on Aug. 10, 2022, with the application No. 202210955940.0, titled "bismuth/bismuth titanate heterojunction hollow nanospheres and method for preparing the same and application thereof". The entire contents of the Chinese patent application are incorporated herein by reference and constitute a part of the present invention.

TECHNICAL FIELD

The present invention belongs to the field of new material technology and relates to a bismuth/bismuth titanate heterojunction hollow nanospheres and method for preparing the same and application thereof.

BACKGROUND

The disclosure of the information in this background art section is merely intended to add to the understanding of the general background of the present invention and is not necessarily to be regarded as an acknowledgement or an implication in any way that the information constitutes prior art that has become generally known to those of ordinary skill in the art.

According to the inventor's research, methods to improve the photocatalytic activity of bismuth titanate ($Bi_4Ti_3O_{12}$) include element doping, noble metal loading, combination with other semiconductors, etc. However, these modification methods have issues such as complexity of the process, high cost, poor binding stability, etc.

SUMMARY

Due to the significant impact of the catalyst's microstructure on its catalytic activity, the present invention adopts bismuth titanate hollow spheres, which enhance the photocatalytic activity of bismuth titanate through the dual-layer interfaces inside and outside. Preliminary research indicates that hydrothermal methods can produce bismuth titanate hollow spheres, but they require strict control over the amount of mineralizer added; both excess and insufficient quantities fail to produce the desired hollow spheres.

To address the stringent material addition requirements in the current hydrothermal method for preparing bismuth titanate hollow spheres, the present invention provides a solvothermal method for the synthesis of bismuth titanate hollow spheres. However, during the research process of the present invention, the inventors discovered that the bismuth titanate hollow spheres prepared via the solvothermal method not only fail to enhance the photocatalytic degradation activity of tetracycline hydrochloride but also reduce it to non-activity.

To solve the issue of solvothermal-prepared bismuth titanate hollow spheres lacking photocatalytic activity for degrading tetracycline hydrochloride, the present invention provides a bismuth/bismuth titanate heterojunction hollow nanospheres, a method for preparing the same and applications thereof. The bismuth/bismuth titanate heterojunction hollow nanospheres not only exhibit significant photocatalytic activity in degrading tetracycline hydrochloride but also enable a tighter integration of the metal with the photocatalytic material, thereby offering superior structural stability.

To achieve the above objectives, the technical solution of the present invention encompasses one or more of the following technical features.

On one hand, the present invention provides a method for preparing bismuth/bismuth titanate heterojunction hollow nanospheres, which comprises adding a bismuth salt and tetrabutyl titanate into an organic solvent, mixing evenly, adding an inorganic alkali solution to generate a precipitation, then sequentially adding an organic amine and an organic acid, performing a solvothermal treatment to obtain bismuth titanate hollow nanospheres, and then thermally reducing the bismuth titanate hollow nanospheres with a borohydride under an inert atmosphere to obtain the bismuth/bismuth titanate heterojunction hollow nanospheres.

The present invention, by selecting organic solvents, inorganic alkali solutions, organic amines, and organic acids, and controlling their addition, avoids the stringent requirements for the amount of alkali added in the existing hydrothermal method for preparing bismuth titanate hollow spheres.

Moreover, through thermal reduction treatment, the bismuth in bismuth titanate is reduced, enabling in situ growth of metallic bismuth on bismuth titanate, thereby achieving a tighter integration between bismuth and bismuth titanate, which endows the structure with superior stability.

Experiments have shown that the bismuth/bismuth titanate heterojunction hollow nanospheres prepared by the present invention possess excellent photocatalytic degradation performance of tetracycline hydrochloride.

On the other hand, the present invention provides bismuth/bismuth titanate heterojunction hollow nanospheres prepared by the aforementioned method.

Research indicates that the provided bismuth/bismuth titanate heterojunction hollow nanospheres not only exhibit excellent photocatalytic degradation performance of tetracycline hydrochloride but also have catalytic activity under dark conditions. Research has shown that the bismuth/bismuth titanate heterojunction hollow nanospheres provided by the present invention not only possess excellent photocatalytic degradation performance for tetracycline hydrochloride but also demonstrate catalytic activity for degrading tetracycline hydrochloride under dark conditions. In the system of these bismuth/bismuth titanate heterojunction hollow nanospheres, reduction process leads to in situ growth of metallic bismuth on bismuth titanate, resulting in the creation of more oxygen vacancies. These vacancies attract electrons, thus accumulating them, which endows the bismuth/bismuth titanate heterojunction hollow nanospheres with catalytic degradation capability of tetracycline hydrochloride even in the absence of light. On this basis, by synergizing with the photocatalytic activity, the performance of photocatalytic degradation of tetracycline hydrochloride is further enhanced.

In a third aspect, the present invention provides an application of the aforementioned bismuth/bismuth titanate heterojunction hollow nanospheres in the catalytic degradation of tetracycline hydrochloride.

Compared with the existing technologies, the technical solutions conceived in the present invention can achieve the following beneficial effects.

(1) According to the present invention, bismuth salts are dispersed in an organic solvent and then tetrabutyl titanate is added, followed by the sequential addition of inorganic alkali solutions, organic amines, and organic acids. Bismuth/bismuth titanate heterojunction hollow nanospheres are prepared through a solvothermal reaction. This method not only uses cost-effective raw materials but also avoids the issue of stringent requirements for raw material quantities, making it suitable for large-scale production.

(2) According to the present invention, the reduction process induces the in situ growth of metallic bismuth on bismuth titanate, resulting in a tighter integration between bismuth and bismuth titanate, thereby endowing the structure with enhanced stability. This also allows for the reuse of the obtained bismuth/bismuth titanate heterojunction hollow nanospheres.

(3) Through the synergistic coordination of bismuth salts, appropriate titanium sources, solvents, and a meticulously designed reaction process, the technical solution of the present invention has been constructed, successfully fabricating bismuth/bismuth titanate heterojunction hollow nanospheres with in situ grown metallic bismuth. Experiments have demonstrated that these bismuth/bismuth titanate heterojunction hollow nanospheres exhibit excellent photocatalytic degradation performance for tetracycline hydrochloride.

BRIEF DESCRIPTION OF THE DRAWINGS

The accompanying drawings to the specification, which form part of the present invention, are used to provide a further understanding of the present invention, and the illustrative examples of the present invention and the description thereof are used to explain the present invention and are not unduly limiting the present invention.

DESCRIPTION OF THE PREFERRED EMBODIMENTS

Figure 1:
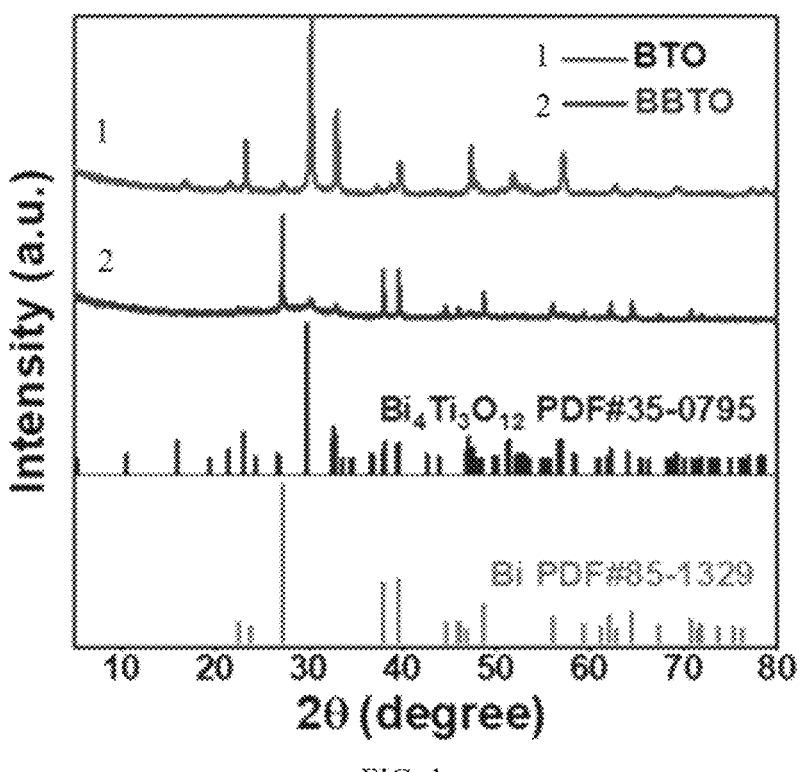
FIG. 1 shows a XRD pattern of BBTO prepared in Example 1 of the present invention.

It should be noted that the following detailed descriptions are all illustrative and intended to provide further clarification of the present invention. Unless otherwise indicated, all technical and scientific terms used herein have the same meaning as commonly understood by one of ordinary skill in the art to which the present invention belongs.

It is to be noted that the terms used herein are intended only to describe specific embodiments and are not intended to limit the exemplary embodiments according to the present invention. As used herein, the singular form is intended to include the plural form as well, unless the context clearly indicates otherwise, and it should also be understood that when the terms "comprising" and/or "including" are used in this specification, they indicate the presence of features, steps, operations, devices, components, and/or combinations thereof, and/or operations, devices, components, and/or combinations thereof.

Given that the solvothermal method for preparing bismuth titanate hollow spheres shows no photocatalytic degradation activity for tetracycline hydrochloride, the present invention proposes bismuth/bismuth titanate heterojunction hollow nanospheres and methods for preparing the same and applications thereof.

A typical embodiment of the present invention provides a method for preparing bismuth/bismuth titanate heterojunction hollow nanospheres, comprising adding a bismuth salt and tetrabutyl titanate into an organic solvent, mixing evenly, adding an inorganic alkali solution to generate a precipitation, then sequentially adding an organic amine and an organic acid, performing a solvothermal treatment to obtain bismuth titanate hollow nanospheres, and then thermally reducing the bismuth titanate hollow nanospheres with a borohydride under an inert atmosphere to obtain the bismuth/bismuth titanate heterojunction hollow nanospheres.

Experiments have shown that the bismuth/bismuth titanate heterojunction hollow nanospheres prepared by the present invention possess excellent photocatalytic degradation performance of tetracycline hydrochloride.

The bismuth salt of the present invention is a cationic bismuth compound, for example, in some embodiments, the bismuth salt is bismuth nitrate. It is shown that bismuth/bismuth titanate heterojunction hollow nanospheres prepared from bismuth nitrate exhibit superior performance.

In one or more embodiments, the organic solvent may be a solution of one or several solvents including propanol, glycerol, isopropanol, ethylene glycol, and 2-methoxyethanol. Although isopropanol, propanol, and glycerol can be used to prepare the bismuth/bismuth titanate heterojunction hollow nanospheres, when using the same amount of bismuth nitrate as a bismuth source and tetrabutyl titanate as a titanium source, the amount of in situ grown metallic bismuth is less compared to using 2-methoxyethanol or ethylene glycol, making 2-methoxyethanol or ethylene glycol the preferred solvents. The solvent used in the method of the present invention greatly influences the purity of the bismuth titanate hollow structure in the system and the formation of bismuth.

In some embodiments, a molar ratio of tetrabutyl titanate to bismuth salt is 1:1-2, preferably 1:1.1-1.4.

In some embodiments, a temperature for solvothermal treatment is 100 to 300° C. To ensure enough thermal driving force for the assembly of bismuth titanate into a hollow structure, setting the temperature between 160° C. and 200° C. is more effective. A duration of solvothermal treatment is 12 to 48 hours, preferably 20 to 36 hours.

The organic acid of the present invention is organic compound with at least one unsaturated bond (like a carbon-carbon double bond) and at least one carboxyl group. In some embodiments, the organic acid is oleic acid, oleic acid d-17, or ricinoleic acid.

In some embodiments, the organic amine is one or more of n-butylamine, isopropylamine, and tert-butylamine, with n-butylamine or tert-butylamine being preferred.

In some embodiments, a temperature for thermally reducing is 200 to 600° C., preferably 300 to 500° C., and a duration is 10 to 100 minutes, preferably 20 to 80 minutes.

In another embodiment of the present invention, there is provided a bismuth/bismuth titanate heterojunction hollow nanospheres prepared by any of the aforementioned method.

In a third embodiment of the present invention, there is provided an application of the above-described bismuth/bismuth titanate heterojunction hollow nanospheres in the catalytic degradation of tetracycline hydrochloride.

In some embodiments, the application involves photocatalytic degradation of tetracycline hydrochloride.

More specifically, the method for photocatalytic degradation of tetracycline hydrochloride comprises adding the bismuth/bismuth titanate heterojunction hollow nanospheres to an aqueous solution containing tetracycline hydrochloride, and treating under dark and/or light irradiation conditions.

To enable those skilled in the art to better understand the technical solutions of the present invention, the following detailed descriptions of specific embodiments will elucidate the technical solutions of the present invention.

Example 1

0.004 mol of bismuth nitrate pentahydrate was dissolved in 20 mL of 2-methoxyethanol, followed by the addition of 0.004 mol of tetrabutyl titanate until uniformly mixed. A white flocculent precipitate was formed by injecting 30 mL of 3 mol/L sodium hydroxide solution. 0.02 mol of tert-butylamine and 0.003 mol of oleic acid were then transferred using a pipette into an autoclave for solvothermal treatment at 160° C. for 24 hours. The powder was collected by washing and drying, resulting in bismuth titanate hollow nanospheres (referred to as BTO). The collected powder was then reduced under a nitrogen atmosphere at 300° C. for 60 min using 0.05 mol of sodium borohydride, followed by multiple washings with anhydrous ethanol and deionized water and centrifugation to obtain bismuth/bismuth titanate ($Bi/Bi_4Ti_3O_{12}$) heterojunction hollow nanospheres material, referred to as BBTO.

The XRD pattern of the BBTO prepared in the example was shown in FIG. 1, indicating the in situ growth of metallic bismuth during the reduction of bismuth titanate.

Figure 2:
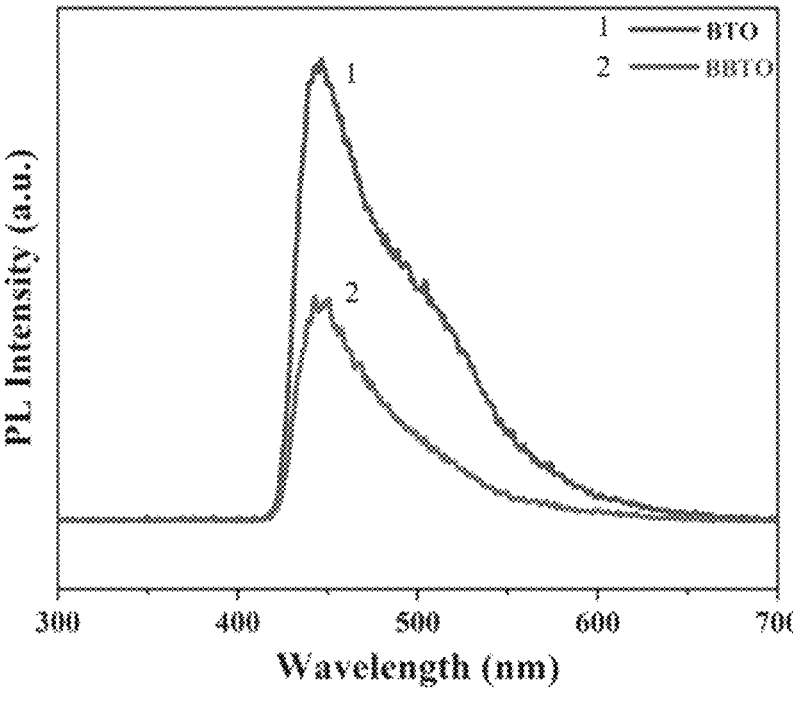
FIG. 2 shows a photoluminescence spectrum of BBTO and BTO prepared in Example 1 of the present invention.
Figure 3:
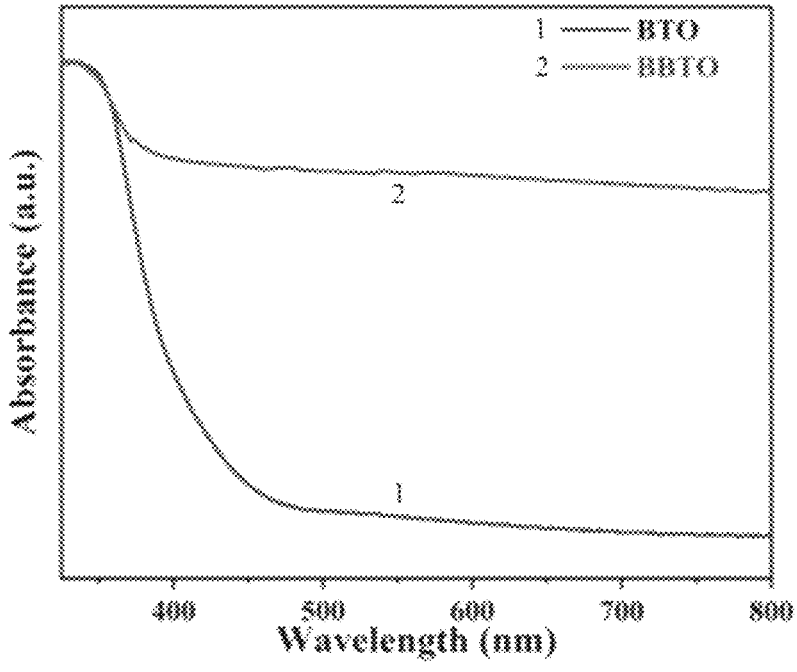
FIG. 3 shows an UV-Vis spectrum of BBTO and BTO prepared in Example 1 of the present invention.
Figure 4:
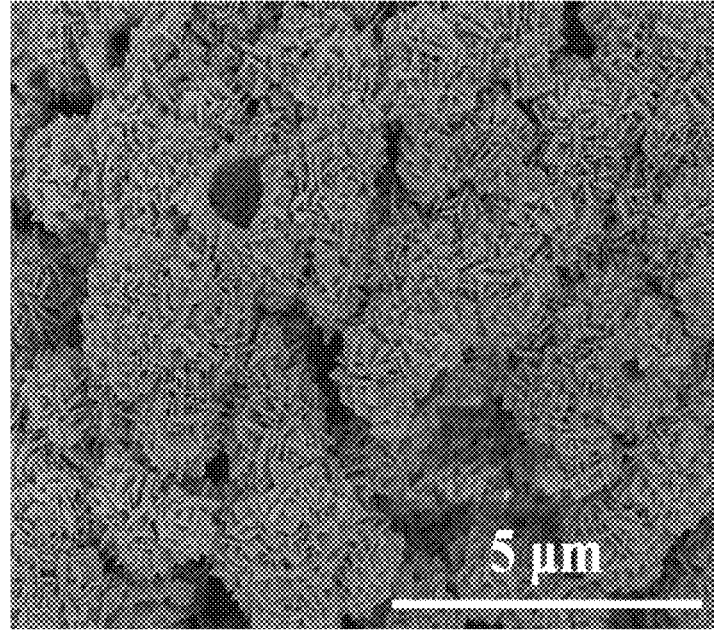
FIG. 4 shows a scanning electron microscope (SEM) image of BBTO prepared in Example 1 of the present invention.
Figure 5:
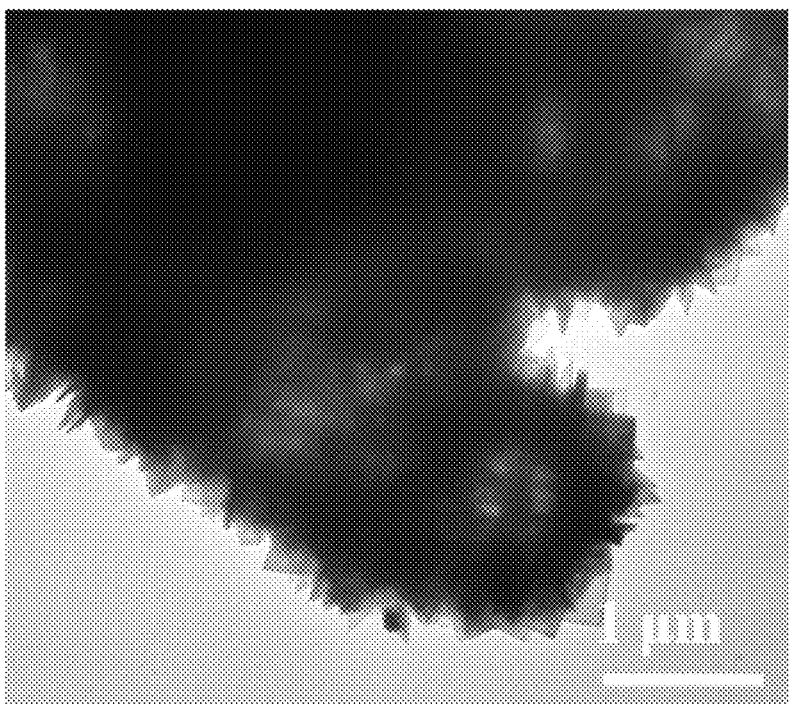
FIG. 5 shows a transmission electron microscope (TEM) image of BBTO prepared in Example 1 of the present invention.

FIG. 2 showed that the BBTO system had a lower photoluminescence signal, suggesting a lower rate of electron-hole recombination. FIG. 3 demonstrated that the BBTO, compared to pure phase bismuth titanate, had a broader response range to light and good absorption ability for visible light. FIG. 4 and FIG. 5 showed the hollow structure of the prepared material.

For the photocatalytic degradation of tetracycline hydrochloride using BBTO prepared in Example 1, the experimental procedure involved dissolving 10 mg of tetracycline hydrochloride in 1 L of water. 0.05 g of BBTO was added to 100 mL of the target tetracycline hydrochloride solution and stirred in the dark for 20 min as a dark box operation. After turning on the light source, a liquid sample was taken every 20 min using a 0.22 μm filter membrane for filtration, with a total of 5 samples taken for UV absorbance testing.

Figure 6:
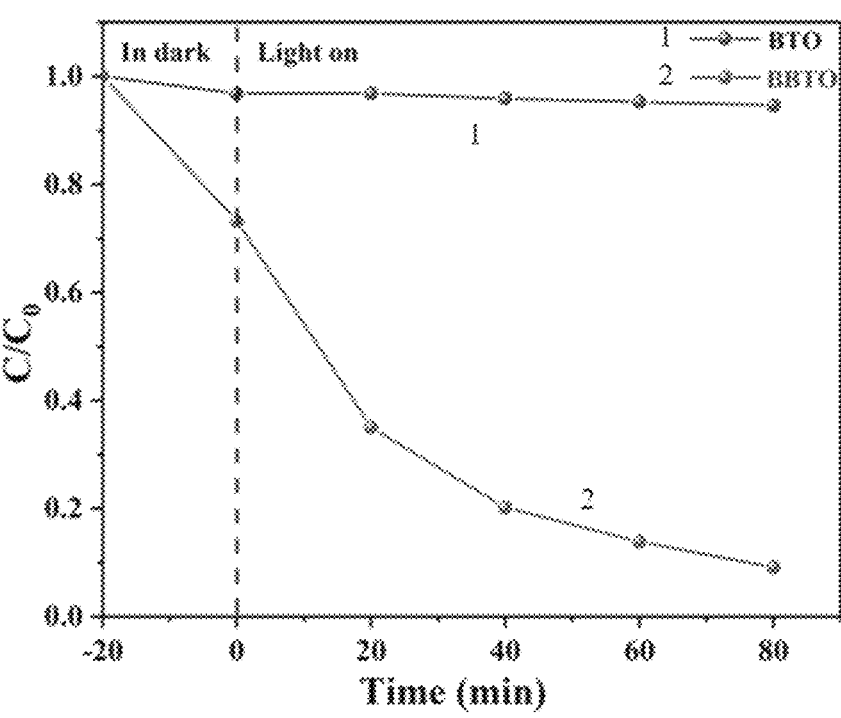
FIG. 6 shows a comparison of the degradation effects on tetracycline hydrochloride by BBTO and BTO prepared in Example 1 of the present invention.

As shown in FIG. 6, firstly, the pure phase bismuth titanate hollow nanospheres prepared in the example did not exhibit any catalytic or photocatalytic degradation activity for tetracycline hydrochloride. However, it was visually evident from FIG. 6 that the BBTO compared to the pure phase bismuth titanate hollow nanospheres showed better degradation performance. Secondly, under dark conditions, the concentration of tetracycline hydrochloride decreased by nearly 25%, indicating that the BBTO prepared in the example itself has some catalytic degradation activity for tetracycline hydrochloride. This was due to the in situ growth of metallic bismuth on bismuth titanate in the BBTO system, creating more oxygen vacancies that attracted electrons and promoted charge separation under polarization, endowing the BBTO with catalytic degradation capability for tetracycline hydrochloride even in the absence of light. Thirdly, when the light source was turned on, the concentration of tetracycline hydrochloride decreased more rapidly, indicating that the BBTO prepared in the example had better photocatalytic degradation activity under light conditions.

For further testing of the photocatalytic degradation of tetracycline hydrochloride using BBTO prepared in Example 1, 5 mg of tetracycline hydrochloride was dissolved in 1 L of water, and 0.05 g of BBTO was added to 100 mL of the target tetracycline hydrochloride solution. Samples were taken every 2 min under different conditions (light source on, stirring, both light source on and stirring) using a 0.22 μm filter membrane for filtration, with a total of 5 samples taken for UV absorbance testing.

Figure 7:
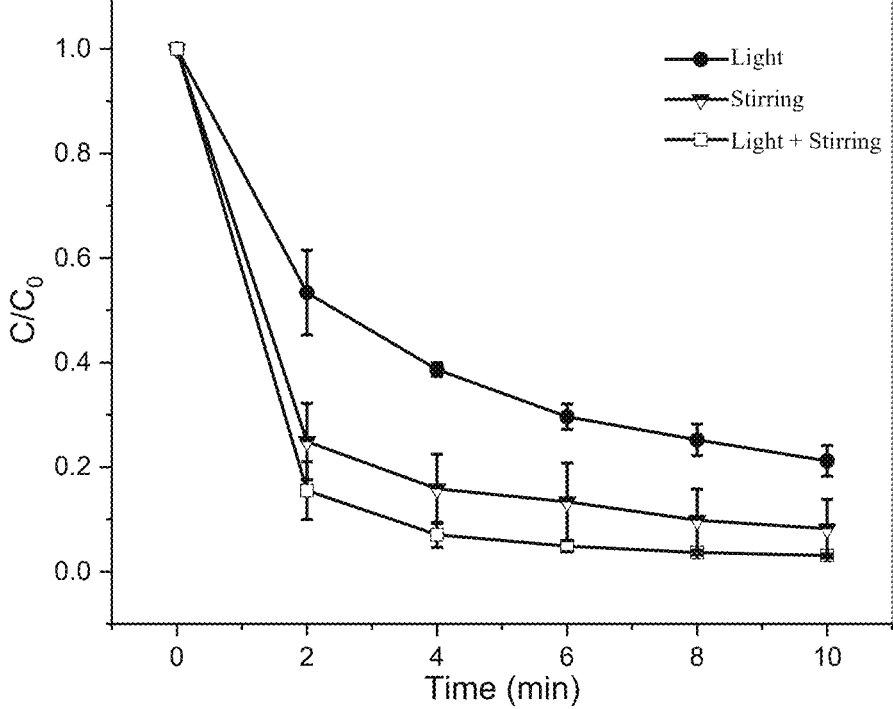
FIG. 7 shows a comparison of the degradation effects on tetracycline hydrochloride by BBTO under different conditions, prepared in Example 1 of the present invention.

As shown in FIG. 7, firstly, under optimized degradation conditions, the BBTO prepared in the example demonstrated even better degradation performance, quickly degrading tetracycline hydrochloride under light and stirring conditions. Degradation activity was also observed under stirring alone without light exposure, indicating that the BBTO had inherent polarization properties, enabling charge separation and thus exhibiting degradation performance. The degradation performance further improved under both light and stirring conditions, suggesting a synergistic effect of light and stirring.

Example 2

0.005 mol of bismuth nitrate pentahydrate was dissolved in 20 mL of ethylene glycol and 0.004 mol of tetrabutyl titanate was added until the mixture became uniform. 30 mL of 4 mol/L potassium hydroxide solution was then injected to form a white flocculent precipitate. 0.02 mol of tert-butylamine and 0.003 mol of oleic acid d-17 were transferred using a pipette into an autoclave for solvothermal treatment at 180° C. for 24 hours. The powder was collected by washing and drying. Then, 0.05 mol of sodium borohydride was used under a nitrogen atmosphere at 400° C. for reduction for 60 min. After multiple washings with anhydrous ethanol and deionized water and centrifugation, the bismuth/bismuth titanate heterojunction hollow nanosphere material was obtained.

Example 3

0.006 mol of bismuth nitrate pentahydrate was dissolved in 20 mL of glycerol and 0.004 mol of tetrabutyl titanate was added until the mixture became uniform. 30 mL of 6 mol/L anhydrous sodium carbonate solution was then injected to form a white flocculent precipitate. 0.02 mol of tert-butylamine and 0.003 mol of ricinoleic acid were transferred using a pipette into an autoclave for solvothermal treatment at 200° C. for 24 hours. The powder was collected by washing and drying. Then, 0.05 mol of sodium borohydride was used under a nitrogen atmosphere at 500° C. for reduction for 80 min. After multiple washings with anhydrous ethanol and deionized water and centrifugation, the bismuth/bismuth titanate heterojunction hollow nanosphere material was obtained.

The above descriptions are only preferred examples of the present invention and are not intended to limit the scope of the present invention. For those skilled in the art, various modifications and changes can be made to the present invention. Any modification, equivalent replacement, or improvement made within the spirit and principles of the present invention should be included within the scope of the present invention's protection.

What is claimed is:

1. A method for photocatalytic degradation of tetracycline hydrochloride, comprising:

(1) preparing bismuth-bismuth titanate heterojunction hollow nanospheres by adding a bismuth salt and tetrabutyl titanate into an organic solvent, mixing evenly, adding an inorganic alkali solution to generate a precipitation, then sequentially adding an organic amine and an organic acid, performing a solvothermal treatment to obtain bismuth titanate hollow nanospheres, and then thermally reducing the bismuth titanate hollow nanospheres with a borohydride under an inert atmosphere to obtain the bismuth-bismuth titanate heterojunction hollow nanospheres; wherein the organic solvent is 2-methoxyethanol or ethylene glycol; wherein a temperature for thermally reducing is 200 to 600° C. for 10 to 100 minutes; and (2) applying the prepared bismuth-bismuth titanate heterojunction hollow nanospheres by adding the bismuth-bismuth titanate heterojunction hollow nanospheres to an aqueous solution containing tetracycline hydrochloride, and irradiating the aqueous solution under light conditions such that photocatalytic degradation of tetracycline hydrochloride occurs.

2. The application as claimed in claim 1, wherein the bismuth salt is bismuth nitrate.

3. The application as claimed in claim 1, wherein a molar ratio of tetrabutyl titanate to the bismuth salt is 1:1-2.

4. The application as claimed in claim 1, wherein a molar ratio of tetrabutyl titanate to bismuth salt is 1:1.1-1.4.

5. The application as claimed in claim 1, wherein a temperature for solvothermal treatment is 100 to 300° C.

6. The application as claimed in claim 1, wherein a temperature for solvothermal treatment is 160 to 200° C.

7. The application as claimed in claim 1, wherein a duration for solvothermal treatment is 12 to 48 hours.

8. The application as claimed in claim 1, wherein the duration for solvothermal treatment is 20 to 36 hours.

9. The application as claimed in claim 1, wherein the organic acid is oleic acid, oleic acid d-17 or ricinoleic acid.

10. The application as claimed in claim 1, wherein the organic amine is one or more of n-butylamine, isopropylamine, and tert-butylamine.

11. The application as claimed in claim 1, wherein the organic amine is n-butylamine or tert-butylamine.

12. The application as claimed in claim 1, wherein the temperature for thermally reducing is 300 to 500° C. for 20 to 80 minutes.

* * * * *